(12) United States Patent
Westveld

(10) Patent No.: US 11,224,998 B2
(45) Date of Patent: Jan. 18, 2022

(54) THREAD FORMING APPARATUS AND METHOD FOR ROTATIONALLY MOLDED PRODUCT

(71) Applicant: Tennant Company, Minneapolis, MN (US)

(72) Inventor: Steven P. Westveld, Marne, MI (US)

(73) Assignee: Tennant Company, Eden Prairie, MN (US)

( * ) Notice: Subject to any disclaimer, the term of this patent is extended or adjusted under 35 U.S.C. 154(b) by 753 days.

(21) Appl. No.: 15/401,863

(22) Filed: Jan. 9, 2017

(65) Prior Publication Data

US 2017/0203477 A1  Jul. 20, 2017

Related U.S. Application Data

(60) Provisional application No. 62/278,645, filed on Jan. 14, 2016.

(51) Int. Cl.
| | |
|---|---|
| *B29C 41/40* | (2006.01) |
| *B29C 41/04* | (2006.01) |
| *B29C 41/42* | (2006.01) |
| *B29D 1/00* | (2006.01) |
| B29L 1/00 | (2006.01) |
| B29C 41/38 | (2006.01) |

(52) U.S. Cl.
CPC .............. *B29C 41/40* (2013.01); *B29C 41/04* (2013.01); *B29C 41/42* (2013.01); *B29D 1/00* (2013.01); *B29C 41/38* (2013.01); *B29K 2905/00* (2013.01); *B29L 2001/00* (2013.01)

(58) Field of Classification Search
CPC ......... B29C 41/04; B29C 41/40; B29C 63/24; B29D 1/00; B23B 5/48; B23G 1/32
See application file for complete search history.

(56) References Cited

U.S. PATENT DOCUMENTS

| | | | | |
|---|---|---|---|---|
| 1,909,726 A | * | 5/1933 | Serenyi | B29C 37/0017 264/295 |
| 2,659,107 A | | 11/1953 | De Bell | |
| 2,957,205 A | * | 10/1960 | Barber | B29C 59/021 264/296 |
| 3,081,644 A | * | 3/1963 | Hudgens | F16H 25/24 74/89.42 |
| 3,099,704 A | * | 7/1963 | Naimer | B29C 45/006 174/138 D |
| 3,150,222 A | * | 9/1964 | Blanstein | B29C 45/2618 264/318 |
| 3,156,008 A | * | 11/1964 | Martin | B29D 1/00 425/422 |
| 3,206,801 A | * | 9/1965 | Costa | B29D 1/00 425/517 |

(Continued)

*Primary Examiner* — Matthew J Daniels
*Assistant Examiner* — Andrew D Graham
(74) *Attorney, Agent, or Firm* — Fredrikson & Byron, P.A.

(57) ABSTRACT

A thread forming apparatus for forming threads in a rotational molding apparatus comprising a molding pin having a generally elongate shape, at least a portion of the molding pin having a threaded portion, the molding pin adapted to rotate along with the mold and receive the plastic material on at least the threaded portion, the molding pin being releasable relative to the mold such that once the plastic material coats the threaded portion of the molding pin and forms a threaded portion on the molded product, the molding pin is completely removed from the mold.

13 Claims, 6 Drawing Sheets

(56) References Cited

U.S. PATENT DOCUMENTS

| | | | | |
|---|---|---|---|---|
| 3,214,506 | A | 10/1965 | Corbin, Jr. | |
| 3,350,745 | A | 11/1967 | Schott et al. | |
| 3,407,251 | A * | 10/1968 | Elliott | B29D 1/00 264/135 |
| 3,486,414 | A * | 12/1969 | Vandersteen | B23B 5/48 409/69 |
| 3,514,508 | A | 5/1970 | Schott et al. | |
| 3,584,092 | A * | 6/1971 | Alexandris | B29C 51/34 264/505 |
| 3,616,520 | A * | 11/1971 | Bucalo | F16C 33/04 29/441.1 |
| 3,685,782 | A * | 8/1972 | Kowell | B28B 23/005 249/86 |
| 3,685,783 | A * | 8/1972 | Hilson | B28B 23/005 249/94 |
| 3,759,480 | A * | 9/1973 | Stier | A63H 9/00 249/142 |
| 4,023,257 | A | 5/1977 | Wright et al. | |
| 4,357,293 | A * | 11/1982 | Williamson, Jr. | B29C 33/14 264/275 |
| 4,383,468 | A * | 5/1983 | Sie | B29C 41/04 86/1.1 |
| 4,695,241 | A * | 9/1987 | Ventimiglia | B29C 33/10 264/301 |
| 4,705,468 | A | 11/1987 | Lebreton et al. | |
| 4,917,846 | A * | 4/1990 | Takase | B29C 33/52 249/59 |
| 4,994,132 | A | 2/1991 | Liekens et al. | |
| 5,061,165 | A * | 10/1991 | Guzikowski | B29C 33/14 249/91 |
| 5,135,700 | A * | 8/1992 | Williams | B29C 45/262 264/145 |
| 5,158,200 | A | 10/1992 | Vago et al. | |
| 5,306,564 | A * | 4/1994 | Guzikowski | F16F 1/041 425/408 |
| 5,356,590 | A * | 10/1994 | Melanson | B29C 45/44 264/328.1 |
| 5,374,026 | A * | 12/1994 | Spurrier | B29C 33/0033 249/111 |
| 5,415,316 | A * | 5/1995 | Pemberton | B60K 15/03177 220/288 |
| 5,431,764 | A * | 7/1995 | Syler | B65D 39/08 156/293 |
| 5,518,679 | A * | 5/1996 | Junk | B29C 45/262 249/59 |
| 5,807,589 | A * | 9/1998 | Defatte | B29C 33/305 264/311 |
| 6,099,975 | A * | 8/2000 | Peterson | B29C 37/0085 220/694 |
| 6,193,924 | B1 | 2/2001 | Huse | |
| 6,221,306 | B1 * | 4/2001 | Johnson | B29C 45/1734 264/572 |
| 6,371,323 | B1 | 4/2002 | Fernandes | |
| 6,415,941 | B1 | 7/2002 | Huse | |
| 7,011,779 | B2 | 3/2006 | Fernandes | |
| 8,133,425 | B2 | 3/2012 | Jones | |
| 10,252,449 | B1 * | 4/2019 | Surridge | B29C 41/04 |
| 2002/0190519 | A1 * | 12/2002 | Erickson | B29C 41/04 280/838 |
| 2003/0156415 | A1 * | 8/2003 | Blatherwick | A63H 33/22 362/293 |
| 2003/0205565 | A1 * | 11/2003 | Nelson | B29C 65/0672 219/148 |
| 2003/0214072 | A1 * | 11/2003 | Nurse | B29C 41/04 264/259 |
| 2004/0071811 | A1 * | 4/2004 | Meuret | B29C 41/38 425/174.4 |
| 2004/0107672 | A1 * | 6/2004 | Falato | B29C 41/04 52/784.1 |
| 2005/0006393 | A1 * | 1/2005 | Carter | B29C 70/086 220/581 |
| 2005/0156349 | A1 * | 7/2005 | Wolfe | B29C 41/04 264/154 |
| 2005/0268843 | A1 * | 12/2005 | DeMent | B29C 41/04 118/52 |
| 2006/0230889 | A1 * | 10/2006 | Kimura | B23B 1/00 82/1.11 |
| 2006/0244180 | A1 * | 11/2006 | Ali | B29C 41/04 264/310 |
| 2006/0249947 | A1 * | 11/2006 | Michael | B29C 41/386 280/837 |
| 2007/0289979 | A1 * | 12/2007 | Jean | B29C 33/0033 220/676 |
| 2008/0248895 | A1 * | 10/2008 | Tavares | A63B 53/0466 473/345 |
| 2009/0218730 | A1 * | 9/2009 | McIntosh | B29C 41/06 264/310 |
| 2009/0266821 | A1 * | 10/2009 | Johnson | B29C 41/04 220/565 |
| 2010/0247865 | A1 * | 9/2010 | Lee | B23B 5/48 428/156 |
| 2012/0273508 | A1 | 11/2012 | Haseloh et al. | |
| 2013/0196067 | A1 * | 8/2013 | Smith | B05D 5/06 427/322 |
| 2014/0101914 | A1 | 4/2014 | Harder | |
| 2014/0102634 | A1 | 4/2014 | Harder | |
| 2014/0117589 | A1 * | 5/2014 | Vanswijgenhoven | F17C 1/06 264/503 |
| 2015/0079378 | A1 * | 3/2015 | Garcia-Leiner | B29C 41/04 428/220 |
| 2015/0375430 | A1 * | 12/2015 | Persico | B29C 41/042 425/117 |
| 2017/0021410 | A1 * | 1/2017 | Stumpf | B22D 17/24 |

* cited by examiner

THREAD FORMING APPARATUS AND METHOD FOR ROTATIONALLY MOLDED PRODUCT

RELATED APPLICATIONS

This application claims priorirty to U.S. Provisional Application 62/278,645 on Jan. 14, 2016, the entire contents of which is hereby incorporated by reference.

TECHNICAL FIELD

The present disclosure relates to apparatus and methods for forming threads during rotational molding of a product.

BACKGROUND

Fluid components such as solution tanks, connectors and other fluid fittings for surface maintenance machines (e.g., a floor scrubbing machine) are typically formed by rotational molding process. Conventional rotational molding apparatuses typically include a rotating mold over which plastic material is coated to form a molded product. Such a conventional rotational molding apparatus may not be able to form threads (e.g., standard NPT pipe threads) in a rotational molded product and require an expensive metal insert or a manual drill and tap operation performed by an operator to create threads for engaging fittings therein. Even so, typically, such conventional processes with either a metal insert or a manual drill and tap operation can form coarse Acme style threads. According to the rotationally molded plastic parts design guide, it is recommended that small fine pitched threads be machined into the part as a secondary operation (e.g., drill and tap) or by utilizing metal inserts.

Manual drill and tap operations rely on operator skill for forming threads after the rotationally molded product is formed. Such a process is difficult to standardize in order to obtain repeatable thread dimensions and tolerances. Moreover, such a process may leave chips, dents, burrs, and/or other surface non-uniformities in the molded product, which may be unsuitable for normal use of the rotationally molded product (e.g., solution tanks and fluid fittings).

Some such conventional rotational molding processes also include forming threads by positioning a threaded metal insert and coating the threads thereof with the plastic material. However, such a process is typically expensive as a result of leaving the metal insert in the molded product. Also, small, fine-pitched threads may not be formed by such a process.

SUMMARY

In one aspect, this disclosure is directed to a rotational molding apparatus comprising a molding chamber for housing a mold. The molding chamber can house and rotate a mold and coat the mold with a plastic material. The molding chamber comprises an oven configured for supplying heat to melt the plastic material and thereby form a molded product that conforms to the shape of the mold. The rotational molding apparatus can further comprise a thread forming apparatus connected to the mold. The thread forming apparatus can include a molding pin having a generally elongate shape. At least a portion of the molding pin can have a threaded portion. The molding pin can be positioned to extend into the mold. At least the threaded portion of the molding pin can receive the plastic material thereon to form a threaded portion on the molded product complementary to the threaded portion of the molding pin. The molding pin can be connected to the mold such that once the threaded portion on the molded product is formed, the molding pin is removable from the molded product by unthreading the molding pin from the threaded portion of the molded product.

In another aspect, this disclosure is directed to a thread forming apparatus for forming threads in a rotational molding apparatus. The rotational molding apparatus can rotate a mold, coat the mold with a plastic material, supply heat to melt the plastic material and thereby form a molded product that conforms to the shape of the mold. The thread forming apparatus can include a molding pin having a generally elongate shape. At least a portion of the molding pin can have a threaded portion. The molding pin can rotate along with the mold and receive the plastic material on at least the threaded portion. The molding pin can be releasable relative to the molded product such that once the plastic material coats the threaded portion of the molding pin and forms a threaded portion on the molded product, the molding pin is completely removed from the molded product by unthreading the molding pin from threaded portion of the molded product.

According to one aspect, a method of forming threads in a rotationally molded product can involve the step of providing a rotational molding apparatus, comprising a molding chamber and a molding pin, at least a portion of which has a threaded portion. The method can involve the step of positioning a mold within the molding chamber adjoining the molding pin, such that the molding pin is connected to and extending into the mold. The method can further involve the step of rotating the mold and the molding pin. The method can involve the step of providing a plastic material in a solid form within the molding chamber. The method involves the step of supplying heat in the molding chamber to coat the mold and at least the threaded portion of the molding pin with the plastic material and thereby forming a molded product having a body portion conforming to the shape of the mold. The molded product thereby has a threaded portion complementary to the threaded portion of the molding pin such that the threaded portion of the molding pin threadingly engages with the threaded portion of the molded product. The method finally involves the step of unthreading the molding pin from the molded product after forming the molded product to disengage the molding pin from the molded product.

The details of one or more examples are set forth in the accompanying drawings and the description below. Other features, objects, and advantages will be apparent from the description and drawings, and from the claims.

DETAILED DESCRIPTION

Figure 1:
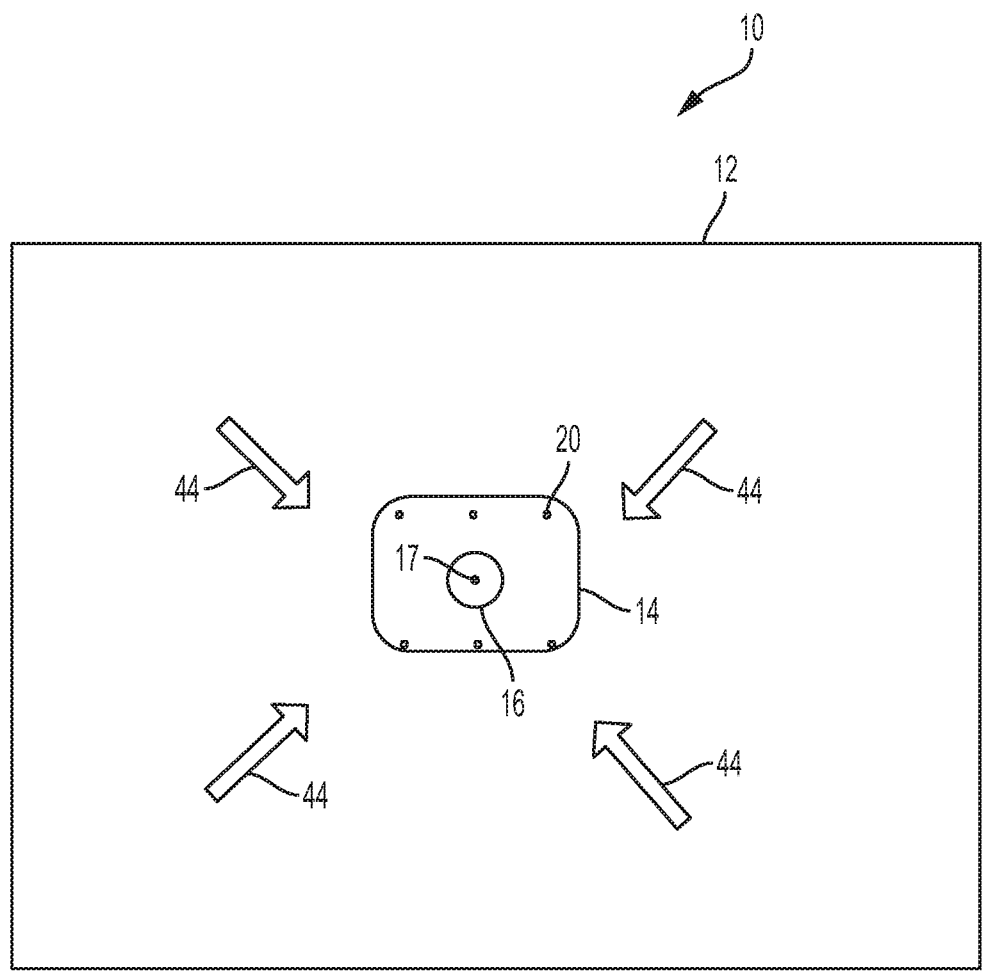
FIG. 1 is a schematic of a rotational molding apparatus according to an embodiment.

FIG. 1 is a schematic of a rotational molding apparatus 10 according to an embodiment. The rotational molding apparatus 10 comprises a molding chamber 12 for housing a mold 14. The molding chamber 12 can house and rotate the mold 14 (e.g., via an arm 16) and coat the mold 14 with a plastic material 20. For example, the mold 14 is coated by placing the plastic material 20 inside the mold and rotating it about an axis 17 (shown as a point in FIG. 1, normal to the plane of the drawing) of the arm 16 to distribute the material inside the mold 14. The material 20 can be a powdered or crystalline plastic material 20, or distributing the plastic material 20 to form a molded product 68. The molding chamber 12 can be an oven for supplying heat to heat the mold 14 and/or melt the plastic material 20 and thereby form a molded product 68 that conforms to the shape of the mold 14. The heat supplied by the oven can be sufficient to cause the plastic material 20 to not undergo a phase change (e.g., melt), and yet cause the plastic material 20 in solid or liquid form to stick to the mold 14 and coat a surface thereof. Such a rotational molding apparatus 10 has been used for forming rotationally molded parts such as fluid storage tanks, flow connectors, and other functional products such as shrouds, covers and the like.

Figure 2:
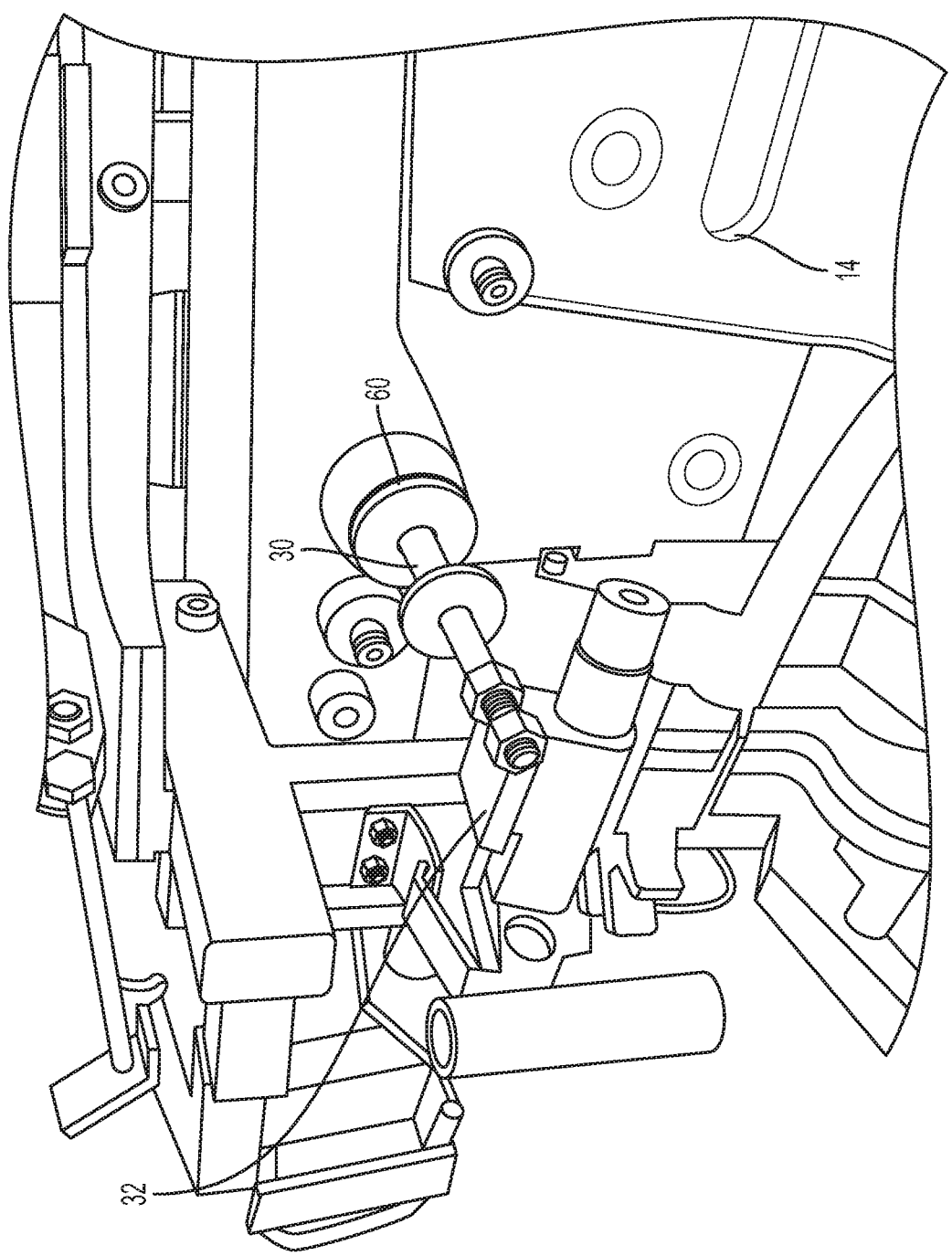
FIG. 2 is a close-up perspective view of the rotational molding apparatus of FIG. 1.

As shown in a partial close-up view of FIG. 2, the rotational molding apparatus 10 comprises a thread forming apparatus 30 for forming threads in molded products. The thread forming apparatus 30 can be connected to the mold 14 by a mechanical connection. For instance the thread forming apparatus 30 can be connected to the mold 14 by fasteners or clamp 32. The thread forming apparatus 30, as illustrated in FIGS. 1 and 2, while physically connected to the mold 14, may or may not be physically connected to the molding chamber 12. Embodiments such as those shown in FIG. 2 beneficially facilitate removing and reusing the thread forming apparatus 30 after a single rotational molding operation, unlike conventional thread forming apparatus 30 which involve an insert embedded within the molded product 68. The thread forming apparatus 30 of FIG. 2 is therefore releasably connected to the mold 14. For instance, by manipulating the fasteners or clamps, the thread forming apparatus 30 can be released from the mold 14 and can be reused in a subsequent rotational molding process in the same molding chamber 12 (e.g., after the molded product 68 is removed) or in a different molding apparatus.

Figure 3:
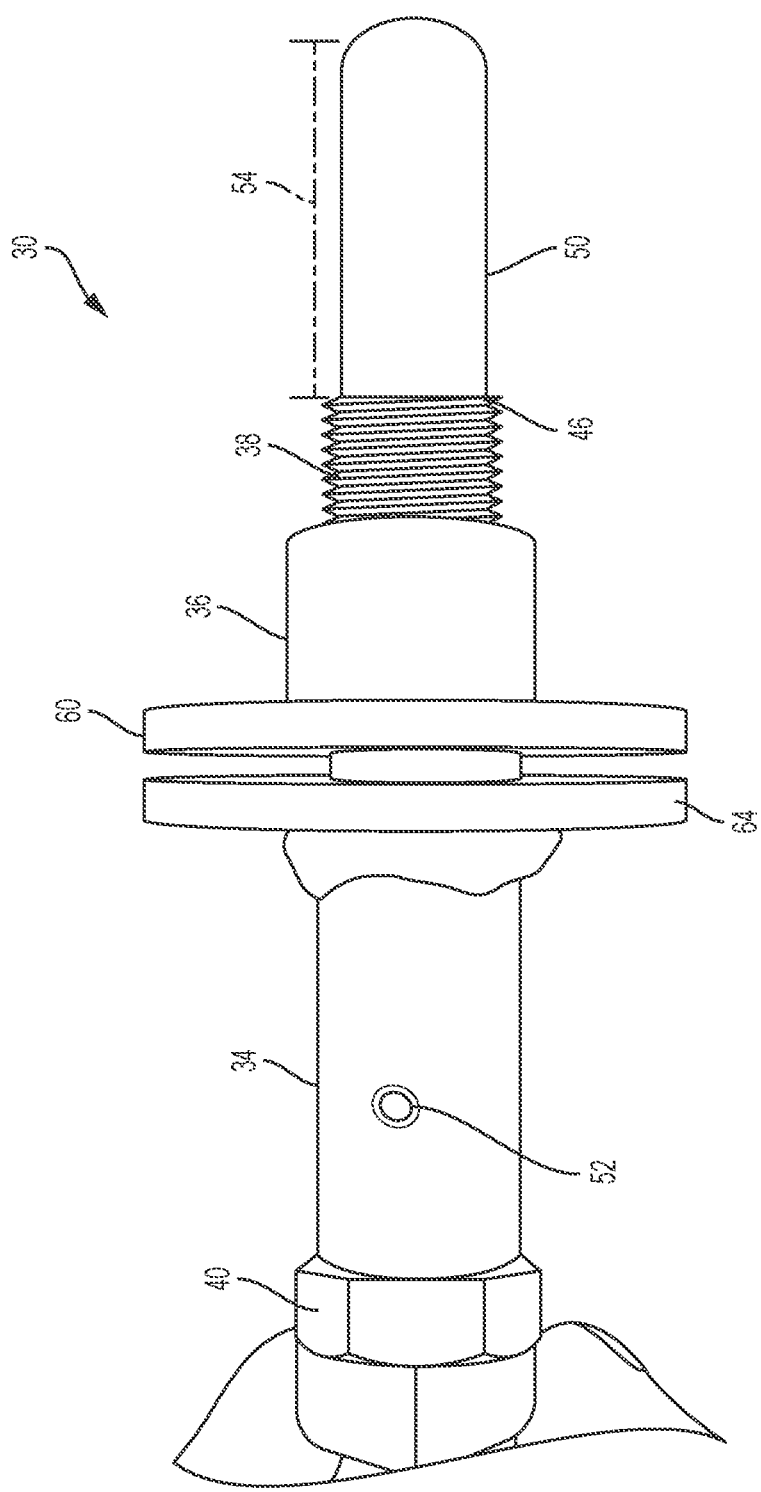
FIG. 3 is a perspective view of a thread forming apparatus shown in FIG. 2.

Referring now to the perspective view of FIG. 3, the thread forming apparatus 30 comprises a molding pin 34 having a generally elongate shape. In the illustrated embodiment, the molding pin 34 is cylindrical. The molding pin 34 comprises a hollow body portion 36 and a threaded portion 38. The hollow body portion 36 advantageously facilitates better heat conduction in a radial direction, and consequently allows the material 20 to conform to the shape of the mold 14 closely. When connected to the mold 14, the molding pin 34 substantially extends into the mold 14, but an unexposed portion (e.g., near end 40 opposite to the threaded portion 38) can be exterior to the mold 14. Such an embodiment allows the molding pin 34 to be disengaged from the mold 14 once a molded product 68 is formed.

As is apparent to one skilled in the art, when the molding pin 34 is connected to and extends into the mold 14, at least the threaded portion 38 of the molding pin 34 receives a plastic material 20 on its outer surface to form a threaded portion on the molded product 68 complementary to the threaded portion 38 of the molding pin 34. The molding pin 34 is continuously rotated (e.g., by an arm 16 of the molding chamber 12) to evenly coat the entire perimeter of the threaded portion 38 with the plastic material 20. The molding pin 34 is rotated at the same rate as the mold 14 such that the rest of the molded product 68 is formed simultaneously along with the threaded portion of the molded product 68. Once the plastic material 20 is placed the mold 14, the molding pin 34 can be heated such that heat from the oven is supplied radially (e.g., along the block arrows 44 shown in FIG. 1) toward the outer surface of the molding pin 34. In some cases, it is desired that the threaded portion of the molded product 68 has an even coating of plastic and does not have burrs, bumps, non-uniformities such as chips or other surface defects due to non-uniform adhering of the molding pin 34. Accordingly, at least the threaded portion 38 of the molding pin 34 is made of a metal to facilitate even distribution of heat throughout the threaded portion 38 of the molding pin 34.

Once the molding pin 34 reaches a sufficient temperature (e.g., by supplying a predetermined amount of heat to the molding pin 34 in the molding chamber 12 for a predetermined amount of time), the plastic material 20 reaches a desired temperature, preferably the melting point of the plastic material 20. In some exemplary cases, the temperature of the molding pin 34 equals or exceeds the melting point of the plastic material 20 such that heat from the molding pin 34 is transferred by radial conduction to the plastic material 20, ultimately melting the plastic material 20. As discussed elsewhere herein, the molding chamber 12 can be an oven permitting a wide range of temperatures to be achievable therein. For instance, if the plastic material 20 is polyethylene, the desired temperature of the plastic material can equal its melting point, at about 264° F. In such cases, the temperature inside the molding chamber 12 (e.g., oven temperature) can be between about 365° F. and about 420° F. such that the molding pin 34 transfers a sufficient amount of heat to reach a plastic material temperature of about 264° F.

The plastic material 20 supplied in solid form melts upon reaching the desired temperature, and adheres to the exterior surface over the desired portions of the molding pin 34. For example, if it is desired that the plastic material 20 adheres to the threaded portion 38 and not to the body portion, the exterior surface of portions of the molding pin 34 other than its threaded portion 38 (e.g., body portion) can be coated with a polymer having a thermal conductivity substantially different from the thermal conductivity of the threaded portion 38, such that the plastic material 20 that coats the threaded portion 38 of the molding pin 34 is prevented from adhering to portions of the molding pin 34 other than its threaded portion 38. For instance, the exterior surface of the body portion of the molding pin 34 can be coated with at least one of polytetrafluoroethylene (Teflon) and polyether ether ketone (PEEK). Teflon and PEEK may prevent the plastic material 20 (comprising polyethylene, polycarbonate, nylon, polyvinylchloride (PVC) in solid or liquid form, polypropylene and the like) from adhering to the outer surface of the body portion of the molding pin 34. As is apparent to one skilled in the art, Teflon and PEEK have a thermal conductivity substantially lower than the thermal conductivity of the threaded portion 38 of the molding pin, so as to prevent the plastic material 20 from adhering to the portions other than the threaded portion 38 of the molding pin 34. While Teflon and PEEK are listed, one skilled in the art will recognize suitable alternatives, such as silicon or ultra-high-molecular-weight polymers, such as UHMW polyethylene. Such embodiments allow the molding pin 34 to be easily removed from the mold 14 after the molded product 68 is formed.

As referred to previously, the rotational molding apparatus 10 comprises a hollow body. In some cases, to prevent the end 46 near the threaded portion 38 of the molding pin 34 from adhering to the plastic material 20 and thereby facilitate ease of removal of the molding pin 34 after the molded product 68 is formed, the thread forming apparatus 30 comprises an elongated core 50 inserted into the hollow body of the molding pin 34. The elongated core 50 may be retained on the hollow body by a frictional fit, and/or via a pin connection 52 between the elongated core 50 and the hollow body portion 36 of the molding pin 34. The elongated core 50 is optionally made of a polymer material to prevent the plastic material 20 from coating the hollow body of the molding pin 34 during rotational molding of the molded product 68. As is the case with the exterior surface of the body portion of the molding pin 34, the elongated core 50 can also be made of Teflon or PEEK to prevent the plastic material 20 from covering the ends of the molding pin 34 proximal to the threaded portion 38.

With continued reference to FIG. 3, the elongated core 50 may optionally comprise vents for allowing air expansion when the molding pin 34 is heated in the molding chamber 12 to prevent blowout of the molding pin 34. Similarly, when the molding pin 34 is cooled after being coated, the vent may draw air to prevent the molding pin 34 from imploding.

The elongated core 50 can have dimensions suitable to prevent bridging in the molded product 68. For example, the elongated core 50 can have a length 54 no less than the wall thickness 76 and no greater than about ten times the wall thickness 76 of the molded product 68.

In some embodiments, the outer surface of the molding pin 34 can be treated with a surface treating material, such as a surface enhancer to prevent formation of surface defects during the molding process. The surface enhancer can be a liquid, gel, or aerosol which can be applied on the mold 14 and/or threaded portion 38 of the molding pin 34 prior to being coated with the plastic material 20. An exemplary surface enhancer is the Surface Enhancer® 360 by Mold-In Graphic System® of Clarkdale, Ariz. One skilled in the art will recognize other suitable alternatives (e.g., surfactants, gels, polymers, and the like) for treating the surface of the molding pin 34. Once coated with a surface enhancer, the threaded molded product 68 does not have surface defects such as air bubbles, chips, burrs, partial threads, dents and other non-uniformities.

Embodiments such as those disclosed above allow the molding pin 34 to be easily removed without causing any damage to the molded product 68 or the molding pin 34, while ensuring threads of sufficient size are formed in the molded product 68. For instance fine threads such as ½, ¾, ⅜ and 1" NPT pipe threads as well as NPTF pipe threads (standard or metric equivalent threads of the sizes listed herein), tapered threads, rounded threads and the like can be formed with the thread forming apparatus 30 disclosed herein, which are not possible with conventional thread forming processes.

Figure 4A:
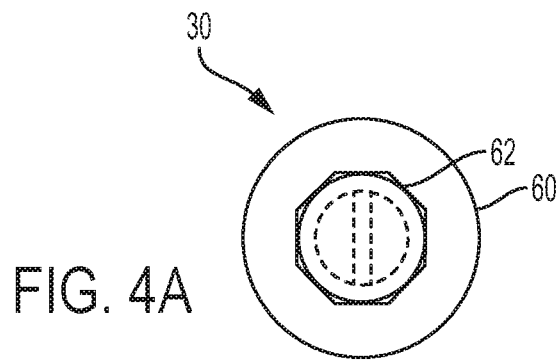
FIG. 4A and FIG. 4B show respectively, a top view and a sectional front view of the thread forming apparatus shown in FIG. 2.
Figure 4B:
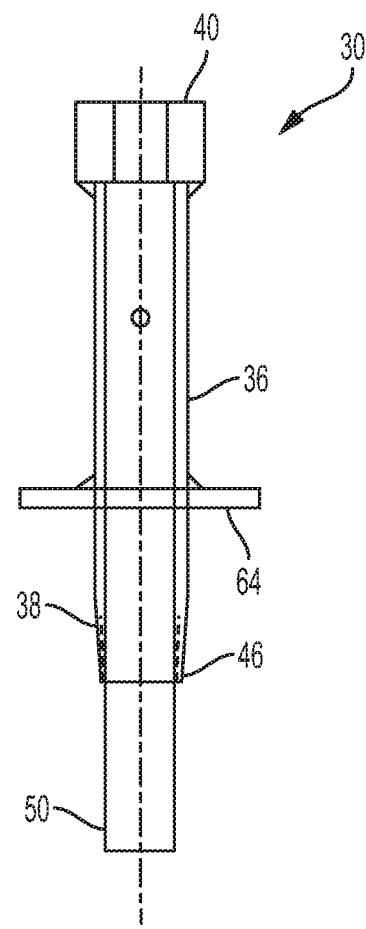

As is apparent to one skilled in the art, the threaded portion 38 of the molding pin 34 threadingly engages with the threaded portion of the molded product 68 once the molded product 68 is formed. Continuing with the foregoing description, and referring to FIGS. 1 and 4, the thread forming apparatus 30 can be secured to the molding chamber 12 to interface with the mold 14 and yet be easily releasable. For instance, the molding pin 34 can be connected to the mold 14 such that once the threaded portion on the molded product 68 is formed, the molding pin 34 is removable from the mold 14 by releasing the connection of the molding pin 34 with the mold 14 using mechanical means known to one skilled in the art. Accordingly, the thread forming apparatus 30 comprises an end 40 positioned exterior to the mold 14 (e.g., opposite to the end 46 proximal to the threaded portion 38) which can be manipulated such that the molding pin 34 is either secured with or released from the mold 14. In the illustrated embodiment, for instance, the end 40 is hexagonal in shape, and a hex-headed wrench can be engaged with the end 40. When a torque is applied via the wrench on the end 40 of the thread forming apparatus 30, the threaded portion 38 of the molding pin 34 threadingly disengages from the threaded portion of the molded product 68 thereby releasing the molding pin 34 from the molded product 68. The molding pin 34 can thus be completely removed from the mold 14 and the molded product 68 and can be used for a subsequent thread forming process in either the same molding chamber 12 (e.g., after the molded product 68 is removed) or in a different molding apparatus. While a hex-headed end 40 is described, other alternatives (e.g., an internal hexagonal shape, internal or external square, slat, or plus shaped ends connectable with complementary shaped tools such as a screw-driver, ratchet or socket) for mechanically decoupling the pin 34 from the molded product 68 are contemplated.

Figure 5:
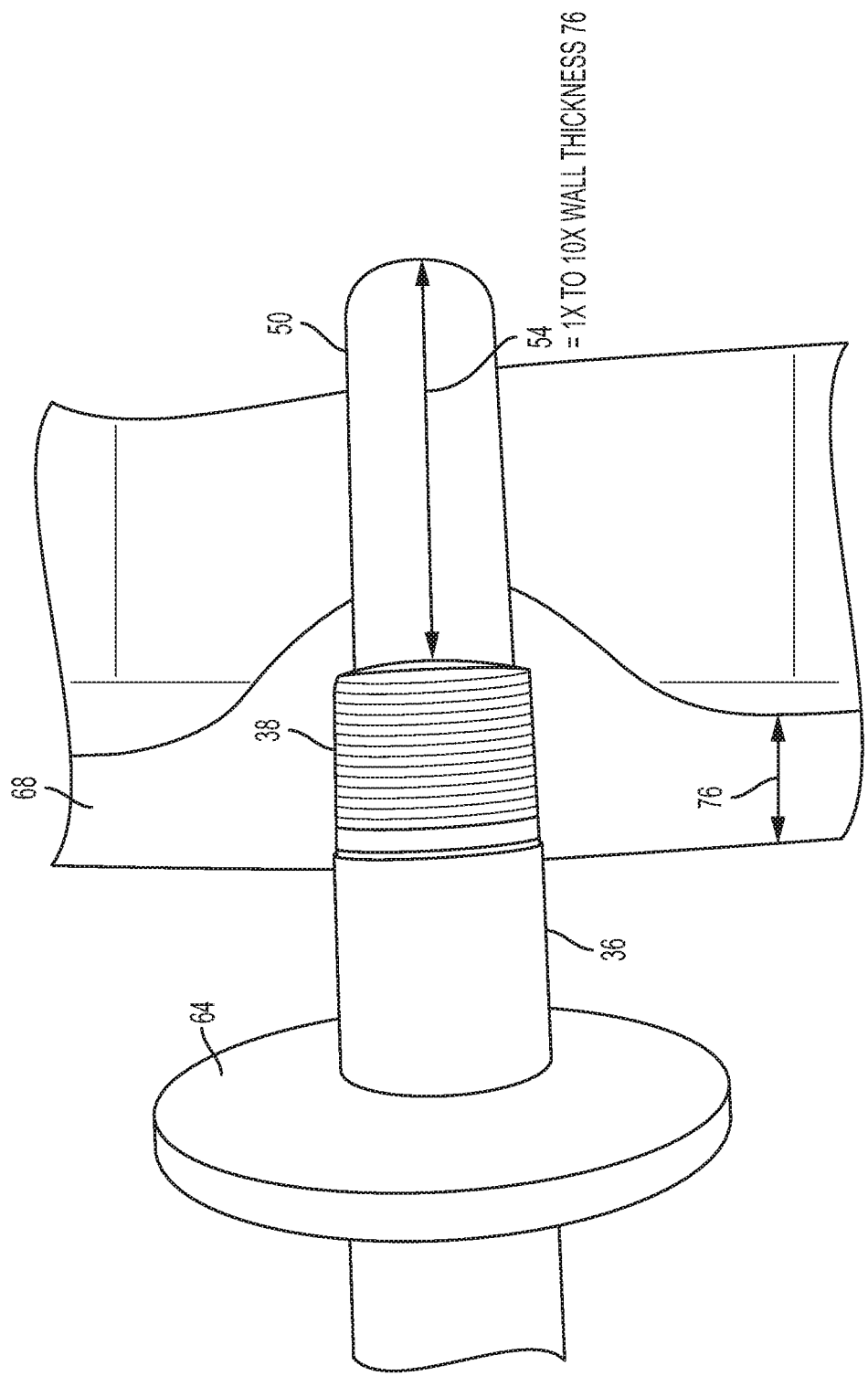
FIG. 5 is a partial sectional view of the thread forming apparatus of FIG. 2 shown together with the mold and the molded product.

The molding pin 34 can interface with the mold 14 in the molding chamber 12 to form threads of desired orientation. Accordingly, as shown in the exploded view of FIG. 4, the thread forming apparatus 30 of comprises one or more sleeves 60 having a central opening 62 for receiving the molding pin 34. The sleeves 60 can be secured to the mold 14 at a desired location such that molds of various shapes and thread configurations (e.g., internal and external threads) are formed. FIG. 5 illustrates an exemplary configuration of the molding pin 34 with the mold 14. In this view, the sleeve can be bolted to the mold 14 (e.g., at a washer 64 welded to the body portion of the mold 14) such that the threaded portion 38 of the molding pin 34 extends into the interior of the mold 14. The sleeves 60 can surround the molding pin 34 and form a tight frictional fit such that there is no gap between the central opening 62 and the molding pin 34. The sleeves 60 can include steel bushings having tightly machined clearances such that the plastic material 20 does not escape into the central opening 62 of the sleeve.

Figure 6:
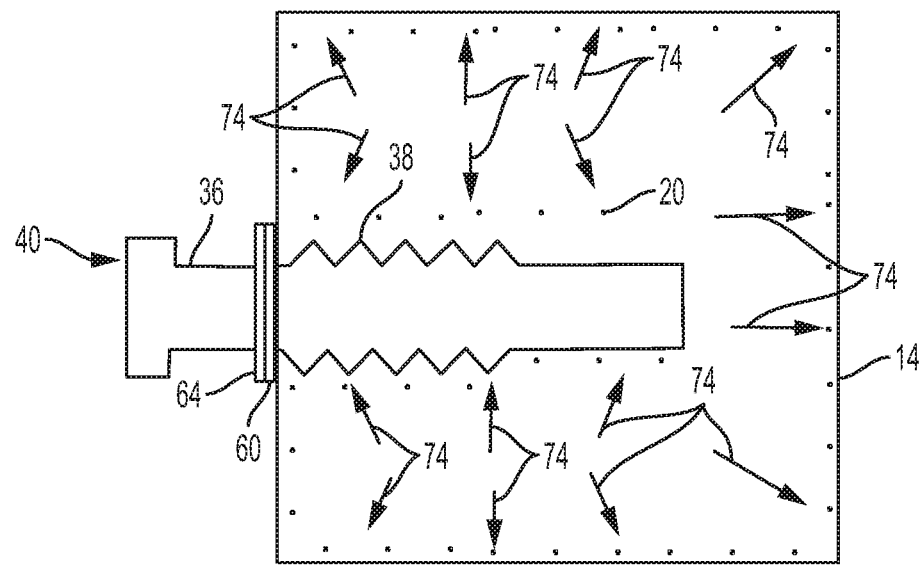
FIG. 6 illustrates an exemplary connection between the thread forming apparatus and the mold to form a molded product with internal threads.
Figure 7:
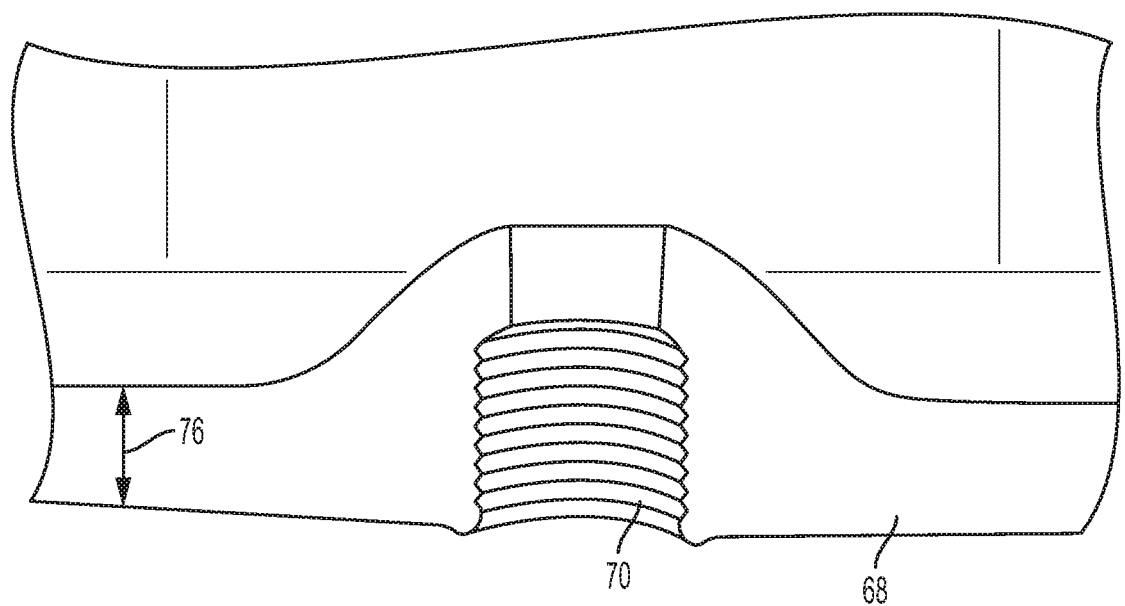
FIG. 7 is a cross-sectional view of an exemplary molded product with internal threads formed by the apparatus of FIG. 6.

FIGS. 6-7 show an exemplary connection between the sleeve and the mold 14 to form a molded product 68 with internal threads 70. In the view shown in FIG. 6, the elongated core 50 protrudes into the mold 14. The plastic material 20 coats the interior surface of the mold 14 and the outer surface of the threaded portion 38 of the molding pin 34 along arrows 74 shown in FIG. 6 such that an internally threaded portion is formed in the molded product 68. FIG. 7 illustrates an exemplary molded product 68 formed in this manner. The threaded portion is on an interior surface 70 of the molded product 68 in the view shown in FIG. 7.

In use, a method of forming threads in a rotationally molded product 68, comprises providing a rotational molding apparatus 10 such as those described herein. A mold 14 of a desired shape is positioned within the molding chamber 12 adjoining the molding pin 34. The mold 14 is inserted via the sleeves 60 (e.g., comprising a steel bushing) and is held in place in the mold 14 (e.g., with a clamp 32) to provide positive alignment. The mold 14 and the molding pin 34 are then rotated via an arm 16 in the molding chamber 12 and a plastic material 20 (e.g., polyethylene, nylon, polyvinyl chloride, polycarbonate) is delivered in a solid form (e.g., crystals or powders) within the molding chamber 12. Heat is then supplied in the molding chamber 12 to coat the mold 14 and at least the threaded portion 38 of the molding pin 34 with the plastic material 20 thereby forming a molded product 68. The molded product 68 has a body portion conforming to the shape of the mold 14 and a threaded portion complementary to the threaded portion 38 of the molding pin 34. The threaded portion 38 of the molding pin 34 threadingly engages with the threaded portion of the molded product 68. As such, the threaded portion of the molded product 68 is formed simultaneously when the body portion of the molded product 68 is formed.

To disengage the molding pin 34 and remove the molded product 68, the threaded connection between the molding pin 34 and the molded product 68 can be removed (e.g., by using a hex headed socket to the end 40 of the molding pin 34 and applying an impact torque to end thereof). Once the molding pin 34 is disengaged from the mold 14, another molded product 68 having a threaded portion can be formed by repeating the steps described in the previous paragraph.

Threads such as 3/16 PTFE threads, 3/4 NPT or NPTF threads and their metric equivalents, fine pitched threads with sharply tapering thread profile (e.g., greater than or equal to 30 degree angles of the thread grooves) and/or rounded threads with sharp radius of curvature can be molded simultaneously with the molded product 68 formed with apparatuses and methods described herein.

Molded products such as solution tanks for surface maintenance machines (e.g., such as Tennant Company's T300 Machine) formed using embodiments described herein form a leak-free tight seal when connected to fluid fittings and hoses. For example, water up to a pressure of 15 psi was held in a rotationally molded solution tank formed using apparatus and methods described herein without having any leaks.

Embodiments disclosed herein demonstrate the ability to successfully rotational mold in small, sharp thread profiles such as tapered pipe threads. Such molded products with thread profiles have not been previously performed using conventional rotomolding processes. Unlike conventional rotomold processes, the threaded portion of the molded product is formed simultaneously, thereby reducing process time. Further, by not having an operator drill and/or tap a threaded portion in the molded product 68 at a post mold 14 or secondary procedures, embodiments described herein are repeatable compared to secondary drilling and tapping operations. Precision parts can also be made with apparatuses and methods described herein as a result of the lack of manual drilling and tapping that relies on operator skill. Molded products such as those formed using embodiments described herein provide a higher quality assembly and reduce/eliminate chips and/or debris inside the molded products. Further, unlike conventional rotational molding that involves the use of a metal insert, molded products formed using apparatuses and methods described herein are inexpensive.

Various examples have been described. These and other examples are within the scope of the following claims.

The invention claimed is:

1. A method of forming threads in a rotationally molded product using a rotational molding apparatus that includes a mold held in a molding chamber, the method comprising:

rotating the mold while connected to a thread forming apparatus and in the molding chamber, the thread forming apparatus defining a central longitudinal axis and including a molding pin and a sleeve, the sleeve secured to the mold and including an opening for receiving the molding pin and a sleeve portion positioned outside of the mold, the molding pin including a threaded portion positioned to extend into the mold, the threaded portion of the molding pin having a width, defined in a direction perpendicular to the central longitudinal axis, that is less than a width of the sleeve portion positioned outside of the mold;

providing a plastic material in a solid form within the molding chamber; and supplying heat in the molding chamber to at least heat the threaded portion of the molding pin to coat the mold and at least the threaded portion of the molding pin with the plastic material and thereby form a molded product having a molded product body conforming to the shape of the mold and a threaded portion of the molded product conforming to the shape of the threaded portion of the molding pin, the threaded portion of the molded product formed simultaneously when the molded product body is formed, the conforming of the threaded portion of the molded product to the threaded portion of the molding pin providing the threaded portion of the molded product complementary to the threaded portion of the molding pin such that the threaded portion of the molding pin threadingly engages with the threaded portion of the molded product and such that the threaded portion of the molding pin is releasable from the threaded portion of the molded product by unthreading the molding pin from the molded product, whereby the threaded portion of the molded product remains after release of the molding pin.

2. The method of claim 1, further comprising applying an impact torque to an end of the molding pin to unthread the molding pin from the molded product.

3. The method of claim 1, further comprising reusing the molding pin to form another molded product having a threaded portion after disengaging the molding pin from the mold.

4. The method of claim 1, wherein the molding pin comprises a hollow body portion and the threaded portion, whereby the hollow body portion facilitates heat conduction in a radial direction toward an outer surface of the molding pin.

5. The method of claim 1, wherein the threaded portion of the molding pin is releasable from the threaded portion of the molded product via a portion of the thread forming apparatus that is positioned exterior to the mold before the rotating the mold, before the providing the plastic material, and before the supplying heat.

6. The method of claim 1, wherein the molding pin comprises an elongated core extending a length outward from the threaded portion, and wherein the elongated core is positioned to extend into the mold.

7. The method of claim 6, wherein the elongated core includes a material configured to prevent the plastic material from covering an end of the molding pin proximal to the threaded portion.

8. A method of forming threads in a rotationally molded product using a rotational molding apparatus, the method comprising:

rotating at least one of a mold of the rotational molding apparatus and a thread forming apparatus connected to the mold, the thread forming apparatus defining a central longitudinal axis and including a molding pin and a sleeve, the sleeve secured to the mold and including an opening for receiving the molding pin and a sleeve portion positioned outside of the mold, the molding pin including a threaded portion positioned to extend into the mold, the threaded portion of the molding pin having a width, defined in a direction perpendicular to the central longitudinal axis, that is less than a width of the sleeve portion positioned outside of the mold; and heating at least the threaded portion of the molding pin to coat the threaded portion of the molding pin with a plastic material and thereby form a molded product having a molded product body conforming to the shape of the mold and a threaded portion of the molded product conforming at least in part to the shape of the threaded portion of the molding pin, the threaded portion of the molded product formed simultaneously when the molded product body is formed, the conforming of the threaded portion of the molded product to the threaded portion of the molding pin providing the threaded portion of the molded product complementary to the threaded portion of the molding pin such that the threaded portion of the molding pin threadingly engages with the threaded portion of the molded product and such that the threaded portion of the molding pin is releasable from the threaded portion of the molded product by unthreading the molding pin from the molded product, whereby the threaded portion of the molded product remains after release of the molding pin.

9. The method of claim 8, further comprising reusing the molding pin to form another molded product having a threaded portion after disengaging the molding pin from the mold.

10. The method of claim 8, wherein the molding pin comprises an elongated core extending a length outward from the threaded portion, and wherein the elongated core is positioned to extend into the mold.

11. The method of claim 10, wherein the elongated core also extends into a hollow body of the molding pin, and wherein the elongated core includes a vent configured to provide air exchange with the hollow body of the molding pin.

12. The method of claim 1, wherein the plastic material coats the mold and the threaded portion of the molding pin at different times.

13. The method of claim 8, wherein the plastic material coats the mold and the threaded portion of the molding pin at different times.

* * * * *